United States Patent
Engla Syam et al.

(10) Patent No.: US 12,342,088 B2
(45) Date of Patent: Jun. 24, 2025

(54) CIRCUITRY AND METHODS FOR MITIGATING GRADIENT EFFECTS IN IMAGE SENSORS

(71) Applicant: SEMICONDUCTOR COMPONENTS INDUSTRIES, LLC, Phoenix, AZ (US)

(72) Inventors: Mukesh Rao Engla Syam, Bangalore (IN); Nicholas Paul Cowley, Wroughton (GB)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 283 days.

(21) Appl. No.: 18/058,926

(22) Filed: Nov. 28, 2022

(65) Prior Publication Data

US 2024/0179430 A1 May 30, 2024

(51) Int. Cl.
| | |
|---|---|
| *H04N 25/673* | (2023.01) |
| *H04N 17/00* | (2006.01) |
| *H04N 25/702* | (2023.01) |
| *H04N 25/78* | (2023.01) |

(52) U.S. Cl.
CPC ......... *H04N 25/673* (2023.01); *H04N 17/002* (2013.01); *H04N 25/702* (2023.01); *H04N 25/78* (2023.01)

(58) Field of Classification Search
CPC .. H04N 25/673; H04N 17/002; H04N 25/702; H04N 25/78; H04N 25/75
See application file for complete search history.

(56) References Cited

U.S. PATENT DOCUMENTS

| | | |
|---|---|---|
| 6,813,723 B1 | 11/2004 | Min |
| 2003/0160753 A1* | 8/2003 | McCartney .......... G09G 3/3611 345/99 |
| 2004/0079973 A1 | 4/2004 | Barna et al. |
| 2006/0203123 A1 | 9/2006 | Kasai |
| 2008/0284891 A1 | 11/2008 | Hattori |
| 2011/0019053 A1 | 1/2011 | Nishihara |
| 2012/0091323 A1 | 4/2012 | Kawahito |

(Continued)

OTHER PUBLICATIONS

Li, Dale. "Settling time challenge and improvement tips," Nov. 13, 2015. https://e2e.ti.com/blogs_/archives/b/precisionhub/posts/settling-time-challenge-and-improvement-tips.

*Primary Examiner* — Yogesh K Aggarwal
(74) *Attorney, Agent, or Firm* — Treyz Law Group, P.C.; Jason Tsai (57) ABSTRACT

An image sensor may include an array of pixels and associated delay calibration circuitry for determining an amount of delay for row control signals. The delay calibration circuitry can include circuitry for generating a calibration row control signal, circuitry for propagating the calibration row control signal down a row of dummy pixels, and one or more sampling circuits coupled to one or more tap points in the row of dummy pixels for monitoring when the calibration row control signal arrives at the one or more tap points. The array of pixels can output signals during normal operation. The image sensor may include column readout circuitry for reading out the signals from the array of pixels. The column readout circuitry can be controlled using sampling signals that are progressively delayed based on count values output from the one or more sampling circuits.

20 Claims, 7 Drawing Sheets

(56) References Cited

U.S. PATENT DOCUMENTS

| | | |
|---|---|---|
| 2014/0313382 A1 | 10/2014 | Jang et al. |
| 2018/0332276 A1* | 11/2018 | Hayashi ............... H04N 17/002 |
| 2019/0110009 A1* | 4/2019 | Komai .................. H01L 27/146 |
| 2022/0262426 A1* | 8/2022 | Chiou ................... G11C 11/413 |

* cited by examiner

CIRCUITRY AND METHODS FOR MITIGATING GRADIENT EFFECTS IN IMAGE SENSORS

BACKGROUND

This relates generally to imaging systems and more specifically to image sensors with large pixel arrays.

An image sensor can include a large pixel array with thousands of rows and thousands of columns. The image sensor can include row control circuitry for providing row control signals to different rows of pixels in the array via corresponding row control lines.

It can be challenging to design an image sensor with large pixel arrays. When the pixel array is very large, the row control lines can exhibit large RC (resistance-capacitance) time constants across the array, which can introduce substantial delays during readout or integration. These time delays can lead to variation in performance such as a visible gradient effect across the horizontal (row-wise) dimension of the array or can lead to loss of full well charge. It is within this context that the embodiments herein arise.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels, sometimes referred to as image sensor pixels or imaging pixels. The image sensor pixels include photosensitive elements such as photodiodes that convert the incoming light into image signals. Image sensors may include hundreds, thousands, or millions of imaging pixels. Image sensors may include control circuitry such as driver circuitry for selectively accessing the pixels and readout circuitry for reading out image signals corresponding to the electric charge generated by the photosensitive elements.

Figure 1:
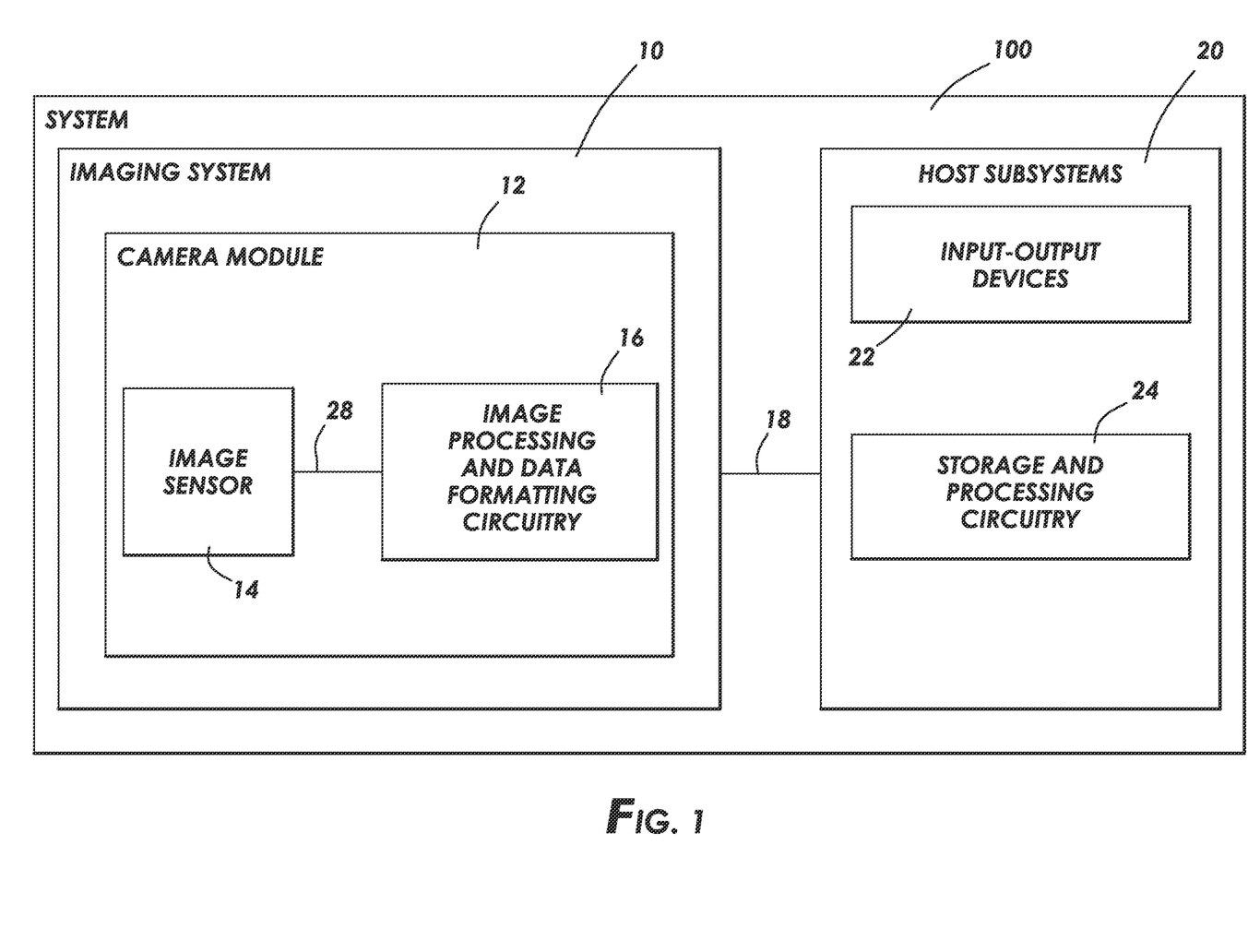
FIG. 1 is a diagram of an illustrative system having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include a camera such as camera module 12. Camera module 12 may include one or more image sensors 14, such as in an image sensor array integrated circuit, and one or more lenses. During image capture operations, each lens may focus light onto an associated image sensor 14. Image sensor 14 may include photosensitive elements such as image sensor pixels that convert incoming light into digital data. Image sensor 14 may include hundreds of pixels, thousands of pixels, millions of pixels, or any desired number of pixels.

Each image sensor in camera module 12 may be identical or there may be different types of image sensors in a given image sensor array integrated circuit. In some examples, image sensor 14 may further include bias circuitry, sample and hold circuitry, correlated double sampling (CDS) circuitry, amplifier circuitry, analog-to-digital converter circuitry, data output circuitry, memory, buffer circuitry, and/or addressing circuitry.

Still and video image data from image sensor 14 may be provided to image processing and data formatting circuitry 16 via path 28. Image processing and data formatting circuitry 16 may be used to perform image processing functions such as data formatting, adjusting white balance and exposure, implementing video image stabilization, or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that are stacked vertically with respect to each other.

Imaging system 10 may convey acquired image data to host subsystem 20 over path 18. Host subsystem 20 may include input-output devices 22 and storage processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 100 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
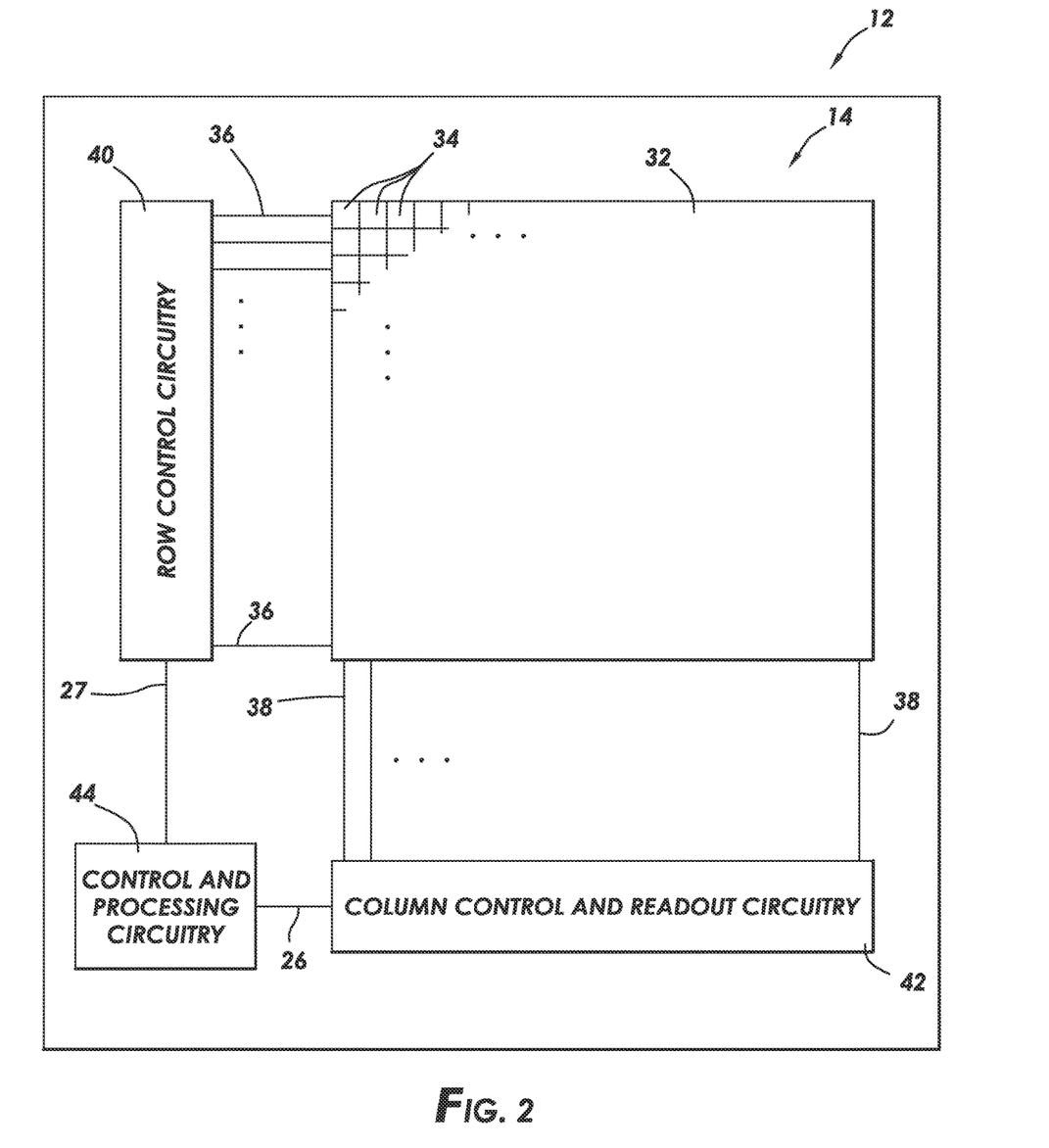
FIG. 2 is a diagram of an illustrative pixel array and associated row and column control circuitry for reading out signals from the pixel array in accordance with some embodiments.

An example of an arrangement of image sensor 14 of FIG. 1 is shown in FIG. 2. As shown in FIG. 2, image sensor 14 may include control and processing circuitry 44. Control and processing circuitry 44, sometimes referred to as control and processing logic, may be part of image processing and data formatting circuitry 16 in FIG. 1 or may be separate from circuitry 16. Image sensor 14 may include a pixel array such as array 32 of pixels 34. Pixels 34 are sometimes referred to herein as image sensor pixels, imaging pixels, or image pixels. Control and processing circuitry 44 may be coupled to row control circuitry 40 via control path 27 and may be coupled to column control and readout circuitry 42 via data path 26.

Row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, or any other desired pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. In some examples, each column of pixels may be coupled to a corresponding column line 38.

For image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and/or column memory for storing the readout signals and any other desired data. Column control and readout circuitry 42 may output digital pixel readout values to control and processing logic 44 over line 26.

Pixel array 32 may have any number of rows and columns. In general, the size of image pixel array 32 and the number of rows and columns in array 32 will depend on the particular implementation of image sensor 14. While "rows" and "columns" are generally described herein as being horizontal and vertical, respectively, the terms rows and columns may be used interchangeably and can refer to any grid-like structure. Features described herein as "rows" may be arranged vertically and features described herein as "columns" may be arranged horizontally. In other embodiments, pixel array 32 can be grouped into tiles or subregions that are equal in size or different in size. As an example, the pixel array can be divided into four regions of equal sizing and area. In general, the pixel array can be divided into more than four subregions, four to ten subregions, 10-20 subregions, 20-50 subregions, or 50-100 subregions that are independently controlled, addressed, and read out.

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern as an example. The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements, yellow color filter elements, etc.) may be used instead of green pixels in a Bayer pattern. These examples are merely illustrative and, in general, color filter elements of any desired color and in any desired pattern may be formed over any desired number of image pixels 34.

An image sensor can sometimes include very large pixel arrays. For example, a large pixel array can include thousands of columns and/or thousands of rows. As described above in connection with FIG. 2, row control circuitry 40 can be used to provide row control signals to corresponding rows of pixels in pixel array 32 via respective row control lines 36. In scenarios where each row of pixels includes thousands or tens of thousands of pixels (columns), the row control lines 36 can exhibit large RC (resistance-capacitance) time constants that result in progressively larger time delays across the width of pixel array 32. If care is not taken, this temporal delay caused by the large RC time constant can lead to sampling error variation across the pixel array.

Figure 3:
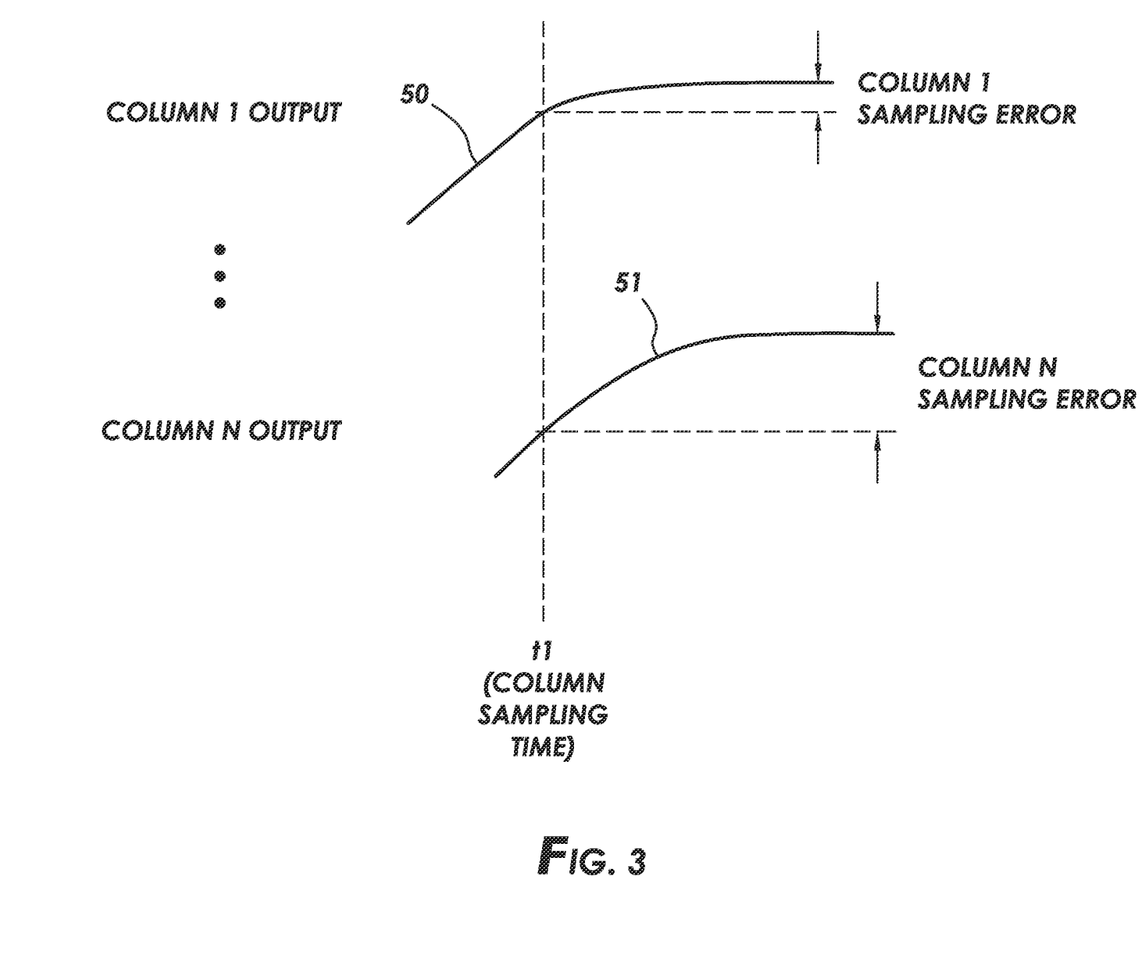
FIG. 3 is a timing diagram illustrating a scenario with mismatched column sampling errors.

FIG. 3 is a timing diagram illustrating a scenario with mismatched column sampling errors. Waveform 50 represents the output voltage waveform read out from a first column in the pixel array. Waveform 51 represents the output voltage waveform read out from a last ($N^{th}$) column in the pixel array. Due to the large RC time constants on the row control signals used for readout such as delays in a row select signal, a charge transfer signal, a reset signal, and/or other row control signals, waveform 51 may experience a time lag or may be delayed relative to waveform 50. If the column readout circuits were to sample all the columns at the same time, say at time t1 as shown in FIG. 3, then it is clear that the sampling error of the $1^{st}$ column will be different than the sampling error of the $N^{th}$ column due to the time delay. As shown in FIG. 3, the sampling error of an output signal can be defined as the difference in voltage between the final settled voltage level and the sampled voltage level.

Figure 4:
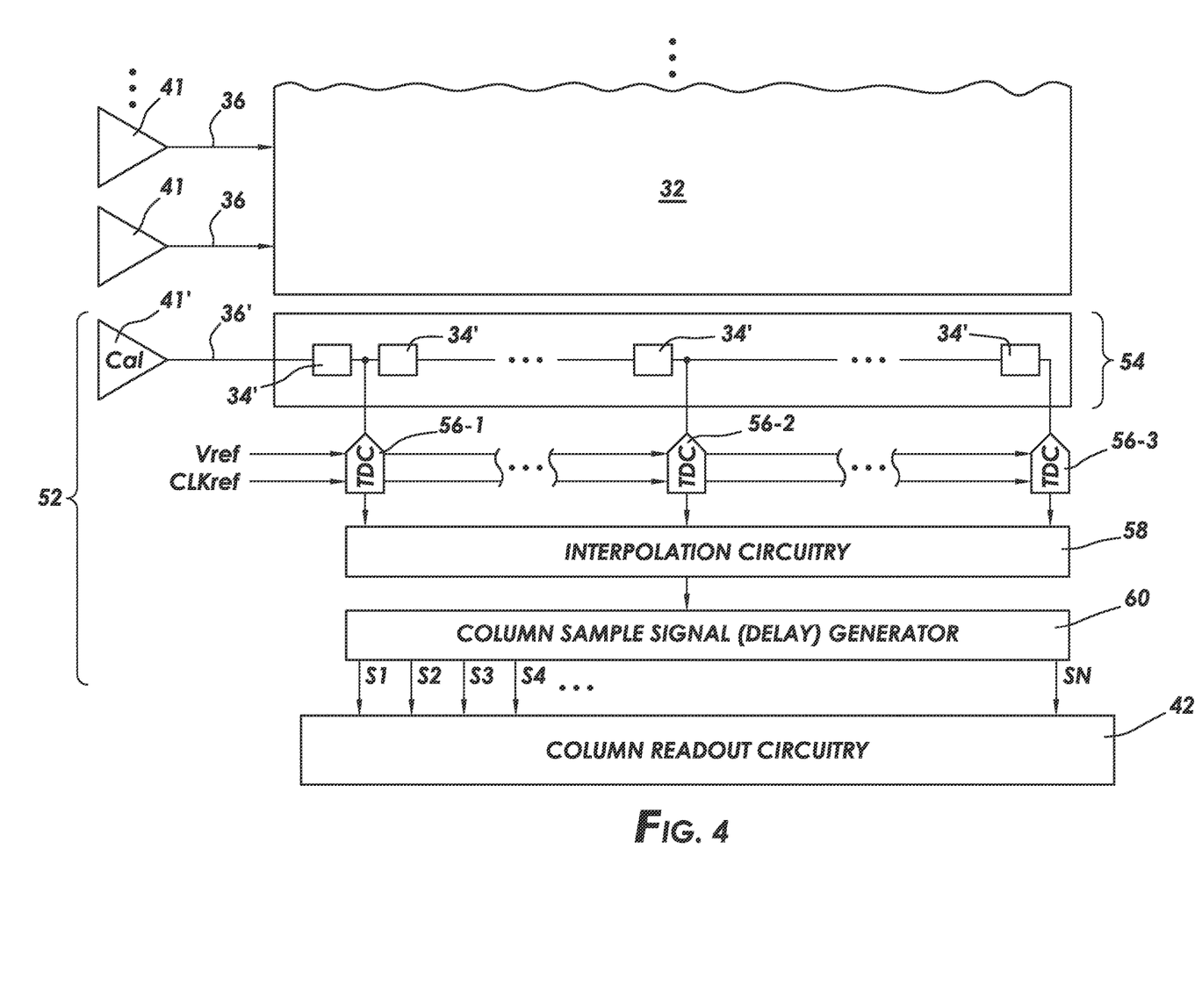
FIG. 4 is a diagram showing illustrative delay calibration circuitry configured to calibrate control line delays across a pixel array in accordance with some embodiments.

In accordance with an embodiment, image sensor 14 may be provided with delay calibration circuitry configured to calibrate control line delays across a large pixel array to help mitigate the RC time constants on the control lines. FIG. 4 is a block diagram showing an image sensor pixel array coupled to illustrative calibration circuitry such as delay calibration circuitry 52. As shown in FIG. 4, pixel array 32 may be part of an active imaging region or area that includes pixels for capturing an image and may receive row control signals from row driver circuits such as row drivers 41. Row drivers 41 may be formed as part of row control circuitry 40 shown in FIG. 2. Each row of pixels in array 32 may receive one or more row control signals from one or more row drivers 41 via row lines 36.

Delay calibration circuitry 52 may include a delay calibration row 54 driven using a calibration row driver 41'. Calibration row driver 41' is configured to generate one or more calibration row control signal. Calibration row drivers 41' may be identical or substantially similar to the active row drivers 41 driving pixel array 32. Delay calibration row 54 may include a row of dummy pixels 34'. Delay calibration row 54 may be considered separate from the active imaging pixel array 32. Dummy pixels 34' may have a pixel structure that is similar or substantially identical to the image sensor pixels 34 in the active imaging pixel array 32.

Figure 5:
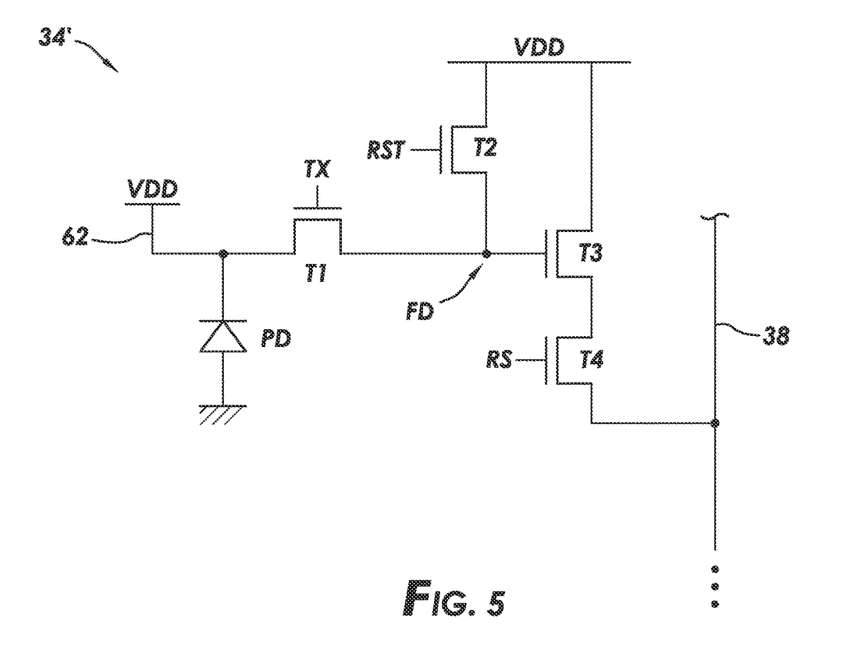
FIG. 5 is a circuit diagram of an illustrative dummy pixel in accordance with some embodiments.

FIG. 5 is a circuit diagram of an illustrative dummy pixel 34'. As shown in FIG. 5, dummy pixel 34' may include a photosensitive element such as a photodiode PD and a charge transfer transistor such as charge transfer transistor T1 having a first source-drain terminal coupled to photodiode PD, a second source-drain terminal coupled to floating diffusion node FD, and a gate terminal configured to receive charge transfer control signal TX. Photodiode PD has a p-type (anode) terminal coupled at a ground power supply line, sometimes referred to as a ground line or ground. Unlike a pixel 34 in the active array portion, photodiode PD in dummy pixel 34' can have its n-type (cathode) terminal shorted to a positive power supply line (e.g., a power supply terminal on which positive power supply voltage VDD is provided) via connection path 62. By shorting the cathode to VDD, any charge generated in the floating diffusion node can automatically flow into the positive supply rather than being stored within the photodiode. In other embodiments, the cathode terminal of photodiode PD can alternatively be shorted to ground. Dummy pixel 34' configured in this way can be referred to and defined herein as a dark pixel, a black pixel, a replica dark pixel, or a replica black pixel. Charge transfer transistor T1 is sometimes referred to as a charge transfer gate. Floating diffusion node FD is sometimes referred to as a floating diffusion region.

Pixel 34' may further include a reset transistor T2 having a drain terminal coupled to the positive power supply line on which VDD is provided, a source terminal coupled to floating diffusion node FD, and a gate terminal configured to receive a reset control signal RST. The terms "source" terminal and "drain" terminal when referring to current-conducting terminals of a metal-oxide semiconducting transistor can be used interchangeably and are sometimes referred to as "source-drain" terminals. For example, the drain terminal of reset transistor T2 can be referred to as its first source-drain terminal, and the source terminal of reset transistor T2 can be referred to as its second source-drain terminal, or vice versa.

Dummy pixel 34' may also include a source follower transistor T3 having a drain terminal coupled to the positive power supply line, a gate terminal coupled to floating diffusion node FD, and a source terminal. Source follower transistor T3 is sometimes simply referred to as a "source follower." Dummy pixel 34' may further include a row select transistor T4 having a drain terminal coupled to the source terminal of source follower T3, a gate terminal configured to receive a row select control signal RS, and a source terminal coupled to a corresponding column line 38. Column line 38 may be coupled to more than 10 pixels in a column of pixels, 10-100 pixels in the column, hundreds of pixels in the column, or thousands of pixels in the column. Column line 38 is sometimes referred to as a pixel output line or a pixel output column line. In scenarios where the photodiode in dummy pixel 34' is shorted to VDD, the column line 38 can be precharged to a low voltage and a low-to-high voltage can be read out. In scenarios where the photodiode in dummy pixel 34' is shorted to ground, the column line 38 can be precharged to a high voltage and a high-to-low voltage can be read out. In this latter scenario where a high-to-low voltage is read out, a very low noise (VLN) current source can be connected to column line 38 to pull down the voltage on line 38 during readout operations.

In the example of FIG. 5, transistors T1-T4 may all be n-type metal-oxide-semiconductor (NMOS) transistors. In other embodiments, at least some transistors T1-T4 can alternatively be implemented as p-type metal-oxide-semiconductor (PMOS) transistors. In yet other embodiments, dummy pixel 34' can optionally include four or more n-channel and/or p-channel transistors.

The example of FIG. 5 in which dummy pixel 34' includes four transistor T1-T4 is also merely illustrative. In general, dummy pixel 34' may include the same number of components as imaging pixel 34 in array 32. In other embodiments, imaging pixel 34 and dummy pixel 34' can each include multiple photodiodes coupled to a shared floating diffusion node, fewer than four transistors, more than four transistors, five or more transistors, six or more transistors, one or more storage capacitors, one or more storage nodes, one or more mode switching transistors, multi-conversion gain components, bloom control components, and/or other pixel structures. The imaging pixel 34 and the dummy pixel 34' can be rolling shutter type pixels or global shutter type pixels such as pixels that include additional storage nodes coupled between the photodiode and the floating diffusion region.

Referring back to FIG. 4, delay calibration circuitry 52 may further include sampling circuits such as sampling circuits 56-1, 56-2, and 56-3, an interpolation block such as interpolation circuitry 58, and a delay generator such as column sampling signal (delay) generator 60. Each of the sampling circuits 56-1, 56-2, and 56-3 can be implemented as a time-to-digital converter (TDC) that includes an analog-to-digital converter (ADC) and a counter circuit coupled together in series as an example. If desired, other types of time-to-digital converters can be implemented. The ADC in each time-to-digital converter 56 can receive a reference voltage Vref that is set to mimic an expected voltage level at each dummy pixel 34'. Each time-to-digital converter 56 can also receive a reference clock signal CLKref that can include a start pulse for synchronizing with calibration row driver 41' to begin conversion at the same time across calibration row 54.

Calibration row driver 41' may output one or more row signals to calibration row 54 via a row line 36'. Calibration row driver 41' may be configured to output a row select signal to row select transistor T4 in each dummy pixel 34' (see FIG. 5), a charge transfer signal to charge transfer gate T1 in each dummy pixel 34', a reset signal to reset transistor T2 in each dummy pixel 34', and/or may be configured to output other row control signals over row line 36'. The same voltage value may be read out from each dummy pixel 34' in row 54. Since the photodiode in each dummy pixel 34' is shorted to VDD, the same high value can be read out from each dummy pixel 34' as the row control signal propagates down row line 36'.

The sampling circuits 56 can be coupled to various tap points in calibration row 54. In the example of FIG. 4, a first TDC 56-1 is coupled to the first (leading) dummy pixel 34' in calibration row 54; a second TDC 56-1 is coupled to the center (middle) dummy pixel 34' in calibration row 54; and a third TDC 56-3 is coupled to the last (trailing) dummy pixel 34' in calibration row 54. Configured in this way, the counter circuit in each TDC 56 can be used to measure the amount of time that has elapsed between the start pulse in signal CLKref and when the row control signal output from row driver 41' arrives at each respective tap (sampling) point. The count value or delay should increase from left to right as the row control signal propagates down the length of row line 36'. The count value output by the counter of each TDC 56 can optionally be stored for post-processing to determine the amount of propagation delay across the delay calibration row 54.

In certain embodiments, interpolation circuitry 58 can be configured to receive the stored count values from each sampling circuit 56. In the example of FIG. 4 where three sampling circuits 56 are used, interpolation circuitry 58 may be configured to perform a first linear interpolation between the count values output from circuits 56-1 and 56-2 and to perform a second linear interpolation between the count values output from circuits 56-2 and 56-3. This example in which delay calibration circuitry 52 includes three sampling circuits 56 is merely illustrative.

In another embodiment, delay calibration circuitry 52 may include only two sampling circuits 56. In this embodiment, a first TDC can be coupled to a first tap point at the first (leading) dummy pixel 34' in the calibration row, whereas a second TDC can be coupled to a second tap point at the last (trailing) dummy pixel 34' in the calibration row. In this example where two sampling circuits 56 are used, interpolation circuitry 58 may be configured to perform only one linear interpolation between the count values output from the first TDC and the second TDC. This example in which delay calibration circuitry 52 includes two sampling circuits 56 is merely illustrative.

In yet another embodiment, delay calibration circuitry 52 may include four sampling circuits 56. In this embodiment, a first TDC can be coupled to a first tap point at the first (leading) dummy pixel 34' in the calibration row, a second TDC can be coupled to a second tap point at a dummy pixel 34' located a third way along row line 36', a third TDC can be coupled to a third tap point at a dummy pixel 34' located two-thirds way along row line 36', and a fourth TDC can be coupled to a fourth tap point at the last (trailing) dummy pixel 34' in the calibration row. In this example where four sampling circuits 56 are used, interpolation circuitry 58 may be configured to perform a first linear interpolation between the count values output from the first and second TDC circuits, a second linear interpolation between the count values output from the second and third TDC circuits, and a third linear interpolation between the count values output from the third and fourth TDC circuits.

This example in which delay calibration circuitry 52 includes four sampling circuits 56 is merely illustrative. A greater number of sampling circuits 56 can help provide improved delay calibration accurate. In general, delay calibration circuitry 52 may include two or more sampling circuits 56 evenly or unevenly distributed along calibration row line 36', three or more sampling circuits 56 evenly or unevenly distributed along calibration row line 36', four or more sampling circuits 56 evenly or unevenly distributed along calibration row line 36', four to ten sampling circuits 56 evenly or unevenly distributed along calibration row line 36', or more than ten sampling circuits 56 evenly or unevenly distributed along calibration row line 36'.

The interpolated values output from interpolation circuitry 58 can be fed to column sample signal generator 60. Column sample signal generator 60 may generate corresponding sampling signals by progressively delaying the sampling signals that are fed to each column readout circuit in circuitry 42 based on the interpolated values. For instance, generator 60 may output based on the interpolated values a first sampling signal S1 that is used to control the column readout circuit for reading out signals from a first column of pixels in array 32, a second sampling signal S2 that is used to control the column readout circuit for reading out signals from a second column of pixels in array 32, a third sampling signal S3 that is used to control the column readout circuit for reading out signals from a third column of pixels in array 32, ..., and an $N^{th}$ sampling signal SN that is used to control the column readout circuit for reading out signals from the last ($N^{th}$) column of pixels in array 32. The column readout circuit receiving the sampling signals S1:SN may include column amplifiers, column analog-to-digital converters, column memory circuits, and/or other column readout components. In other words, the sampling signals S1:SN may be progressively delayed by a similar amount as detected or observed by delay calibration circuitry 52.

Figure 6:
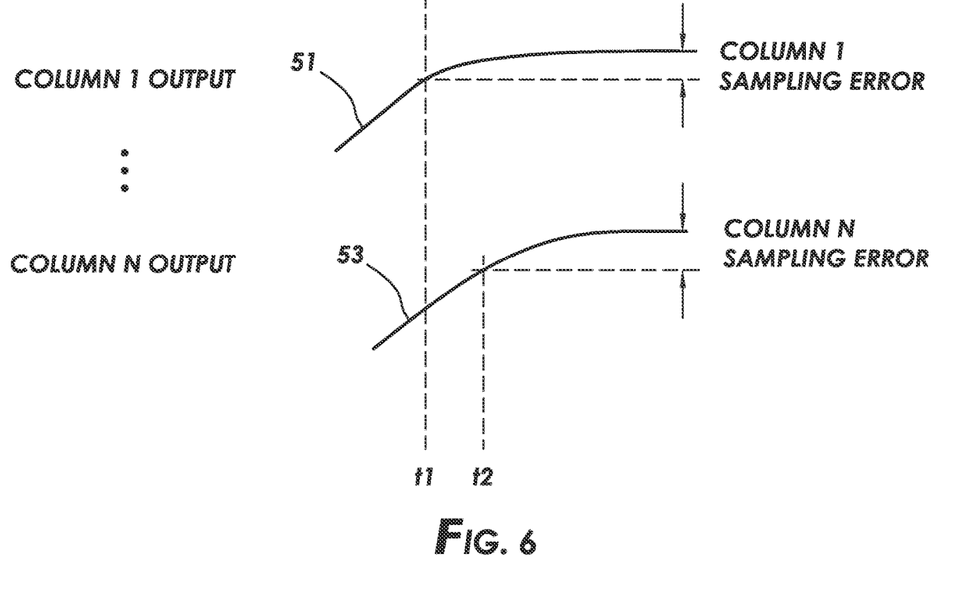
FIG. 6 is a timing diagram illustrating a scenario with matching column sampling errors in accordance with some embodiments.

Progressively delaying the column sampling signals in this way can help equalize the column sampling error between the different pixel columns in the image sensor. FIG. 6 is a timing diagram illustrating a scenario with matched column sampling errors. Waveform 51 represents the output voltage waveform read out from a first column in the pixel array. Waveform 53 represents the output voltage waveform read out from a last ($N^{th}$) column in the pixel array. Due to the large RC time constants on the row control signals used for readout such as delays in a row select signal, a charge transfer signal, a reset signal, and/or other row control signals, waveform 53 may experience a time lag or may be delayed relative to waveform 51.

As shown in FIG. 6, the first column may be sampled using sampling signal S1 at time t1, whereas the last ($N^{th}$) column may be sampled using sampling signal SN at time t2. The amount of delay between time t1 and t2 may be determined using delay calibration circuitry 52 as described above in connection with FIG. 4. Operated in this way, the sampling error of the first column may be substantially equal to or matched with the sampling error of the last column and also every other column in the pixel array. This technique is thus technically advantageous by improving image uniformity across the pixel array, by reducing unwanted gradient artifacts in readout, and can help assist with various types of failure analysis algorithms.

Delay calibration circuitry 52 may perform such calibration operations per frame, once every N frames (where N is equal to two, three, four, five, 2-10, or more than 10), or at an on-demand basis. In example of FIG. 4 in which delay calibration circuitry 52 includes one calibration row 54 of dummy pixels 34' driven using one calibration row driver 41' is also illustrative. In general, delay calibration circuitry 52 can include one or more calibration rows 54 driven using one or more row drivers 41'. In another embodiment, delay calibration circuitry 52 can include two calibration rows of dummy pixels 34' driven by two row drivers 41'. In another embodiment, delay calibration circuitry 52 can include three calibration rows of dummy pixels 34' driven by three row drivers 41'. In another embodiment, delay calibration circuitry 52 can include more than three calibration rows of dummy pixels 34' driven by more than three row drivers 41'. In such cases stochastic or similar averaging may be applied.

Figure 7:
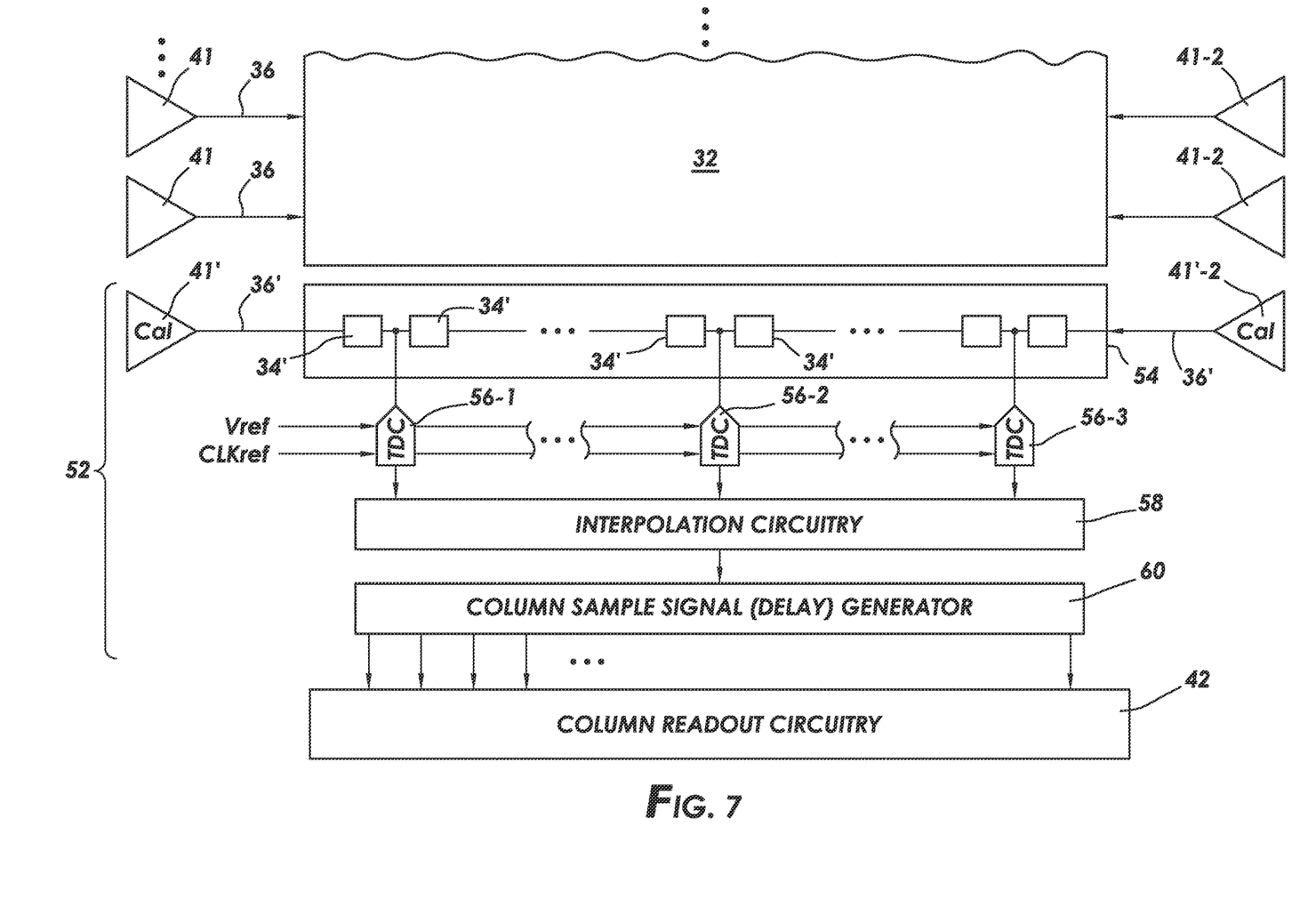
FIG. 7 is a diagram showing illustrative dual-sided delay calibration circuitry in accordance with some embodiments.

The embodiment of FIG. 4 in which pixel array 32 is driven by row drivers 41 from one side of the array and calibration row(s) 54 are driven by calibration row driver(s) 41' from one side of the array is exemplary and not intended to limit the scope of the present embodiments. FIG. 7 illustrates another embodiment in which image pixel array 32 is driven by row drivers from opposing sides (edges). As shown in FIG. 7, pixel array 32 is partially controlled by row signals generated by row drivers 41-1 disposed on a first (left) side of the array and is partially controlled by row signals generated by row drivers 41-2 disposed on a second (right) side of the array. Driving row control signals from both sides of pixel array 32 can help reduce the worst case RC time constant across the array by half.

Delay calibration circuitry 52 may include a calibration row 54 that is driven using a first calibration row driver 41'-1 disposed on a first (left) side of calibration row 54 and a second calibration row driver 41'-2 disposed on a second (right) side of calibration row 54. Calibration row drivers 41'-1 and 41'-2 may be identical or substantially similar to the active row drivers 41-1 and 41-2 driving pixel array 32. Delay calibration row 54 may include a row of dummy pixels 34' of the type shown in connection with FIG. 5 or other types of dummy or black pixels with a similar structure as the active imaging pixels in array 32.

Delay calibration circuitry 52 of FIG. 7 may further include sampling circuits such as sampling circuits 56-1, 56-2, and 56-3, interpolation circuitry 58, and column sampling signal (delay) generator 60. Each of the sampling circuits 56-1, 56-2, and 56-3 can be implemented as a time-to-digital converter (TDC) that includes an analog-to-digital converter (ADC) and a counter circuit coupled together in series as an example. In some examples, the analog-to-digital converter can be a 1-bit ADC or a comparator. If desired, other types of time-to-digital converters can be implemented. The ADC in each time-to-digital converter 56 can receive a reference voltage Vref that is set to mimic an expected voltage level at each dummy pixel 34'. Each time-to-digital converter 56 can also receive a reference clock signal CLKref that can include a start pulse for synchronizing with calibration row driver 41' to begin conversion at the same time across calibration row 54.

Calibration row drivers 41'-1 and 41'-2 may output one or more row signals to calibration row 54 via row line 36'. Calibration row drivers 41'-1 and 41'-2 may be configured to output a row select signal to row select transistor T4 in each dummy pixel 34' (see FIG. 5), a charge transfer signal to charge transfer gate T1 in each dummy pixel 34', a reset signal to reset transistor T2 in each dummy pixel 34', and/or may be configured to output other row control signals over row line 36'. The same voltage value may be read out from each dummy pixel 34' in row 54. Since the photodiode in each dummy pixel 34' is shorted to VDD or ground depending on whether a VLN current source is present, the same high or low value can be read out from each dummy pixel 34' as the row control signal propagates down row line 36'. Row control signals output by calibration row driver 41'-1 will propagate down row line 36' from left to right, whereas row control signals output from calibration row driver 41'-2 will propagate down row line 36' from right to left. The calibration row drivers 41'-1 and 41'-2 can be enabled and/or disabled at the same time, independently at different times, or in a staggered fashion.

The sampling circuits 56 can be coupled to various tap points in calibration row 54. In the example of FIG. 7, a first TDC 56-1 is coupled to the first (leading) dummy pixel 34' in calibration row 54; a second TDC 56-1 is coupled to the center (middle) dummy pixel 34' in calibration row 54; and a third TDC 56-3 is coupled to the last (trailing) dummy pixel 34' in calibration row 54. Configured in this way, TDCs 56-1 and 56-2 or other sampling circuits associated with the left half of the calibration row can be used to measure the amount of time for a row control signal to propagate from row driver 41'-1 from the left edge of the array to the center point. Similarly, TDCs 56-2 and 56-3 or other sampling circuits associated with the right half of the calibration row can be used to measure the amount of time for a row control signal to propagate from row driver 41'-2 from the right edge of the array to the center point. In other words, the count values or delay should increase from left to center, and the count values or delay should increase from right to center. The count value output by the counter of each TDC 56 can optionally be stored for post-processing to determine the amount of propagation delay across the delay calibration row 54.

In certain embodiments, interpolation circuitry 58 can be configured to receive the stored count values from each sampling circuit 56. The example of FIG. 7 in which three sampling circuits 56 are shown is merely illustrative. In other embodiments, delay calibration circuitry 52 may include five sampling circuits 56 evenly or unevenly distributed along calibration row line 36', seven sampling circuits 56 evenly or unevenly distributed along calibration row line 36', nine sampling circuits 56 evenly or unevenly distributed along calibration row line 36', 11 sampling circuits evenly or unevenly distributed along calibration row line 36', 11-101 sampling circuits evenly or unevenly distributed along calibration row line 36', or other odd number of sampling circuits. A greater number of sampling circuits 56 can help provide improved delay calibration accurate. If desired, delay calibration circuitry 52 can also include an even number of sampling circuits. Interpolation circuitry 58 may be configured to perform one or more interpolation operations using count values obtained from sampling circuits 56 associated with the left half of calibration row 54. Interpolation circuitry 58 may be configured to perform one or more interpolation operations using count values obtained from sampling circuits 56 associated with the right half of calibration row 54.

The interpolated values output from interpolation circuitry 58 can be fed to column sample signal generator 60. Column sample signal generator 60 may generate corresponding sampling signals by progressively delaying the sampling signals that are fed to each column readout circuit in circuitry 42 based on the interpolated values. The sampling signals output by generator 60 may be progressively delayed from left to center and from right to center by a similar amount as detected or observed by delay calibration circuitry 52. Progressively delaying the column sampling signals in this way can help equalize the column sampling error between the different pixel columns in the image sensor. This technique is thus technically advantageous by improving image uniformity across the pixel array, by reducing unwanted gradient artifacts in readout, and can help assist with various types of failure analysis algorithms. Delay calibration circuitry 52 may perform such calibration operations one per frame, once every N frames (where N is equal to two, three, four, five, 2-10, or more than 10), or at an on-demand basis.

The example of FIG. 7 in which delay calibration circuitry 52 includes one calibration row 54 of dummy pixels 34' driven using calibration row drivers 41'-1 and 41'-2 is illustrative. In general, delay calibration circuitry 52 can include one or more calibration rows 54 driven using one or more row drivers 41' on both sides of the array. In another embodiment, delay calibration circuitry 52 can include two calibration rows of dummy pixels 34' driven by two row drivers 41'-1 disposed on the left edge of the array and by two row drivers 41'-2 disposed on the right edge of the array. In another embodiment, delay calibration circuitry 52 can include three calibration rows of dummy pixels 34' driven by three row drivers 41'-1 disposed on the left edge of the array and by three row drivers 41'-2 disposed on the right edge of the array. In another embodiment, delay calibration circuitry 52 can include more than three calibration rows of dummy pixels 34' driven by more than three row drivers 41'-1 disposed on the left edge of the array and by more than three row drivers 41'-2 disposed on the right edge of the array.

Figure 8:
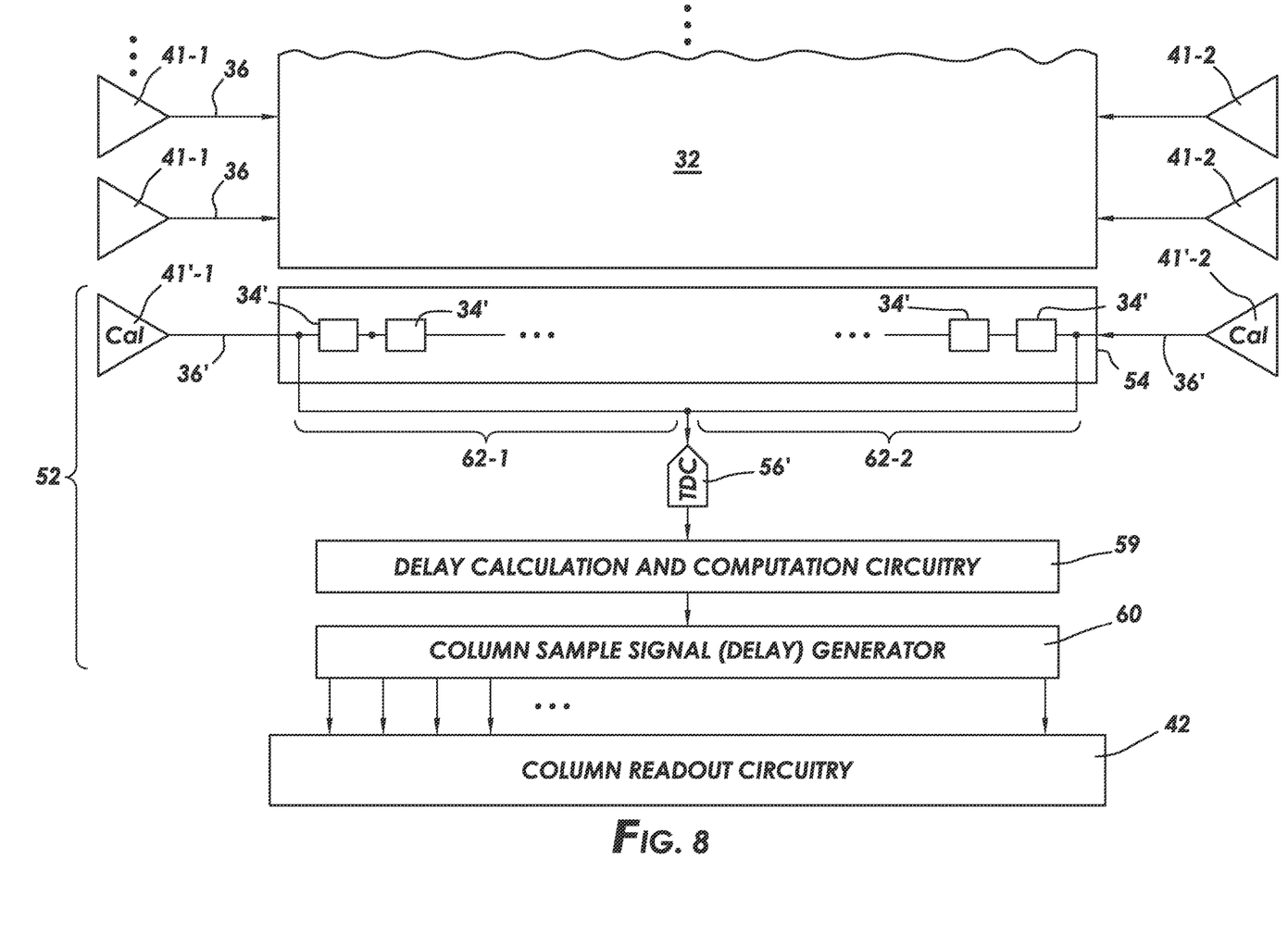
FIG. 8 is a diagram showing illustrative dual-sided delay calibration circuitry having a single sampling circuit in accordance with some embodiments.

The embodiment of FIG. 7 in which delay calibration circuitry 52 includes multiple sampling circuits 56 is exemplary and not intended to limit the scope of the present embodiments. FIG. 8 shows another embodiment in which delay calibration circuitry 52 is driven from opposing ends but employs only a single sampling circuit 56'. As shown in FIG. 8, pixel array 32 can be partially controlled by row signals generated by row drivers 41-1 disposed on a first (left) peripheral of the array and is partially controlled by row signals generated by row drivers 41-2 disposed on a second (right) peripheral edge of the array. Driving row control signals from both edges of pixel array 32 can help reduce the worst case RC time constant across the array by half.

Delay calibration circuitry 52 may include a calibration row 54 that is driven using a first calibration row driver 41'-1 disposed on a first (left) peripheral edge of calibration row 54 and a second calibration row driver 41'-2 disposed on a second (right) peripheral edge of calibration row 54. Delay calibration row 54 may include a row of dummy pixels 34' of the type shown in connection with FIG. 5 or other types of dummy or dark pixels with a similar structure as the active imaging pixels in array 32.

Delay calibration circuitry 52 of FIG. 8 may further include only one sampling circuit such as sampling circuit 56', interpolation circuitry 58, and column sampling signal (delay) generator 60. Sampling circuit 56' can be implemented as a time-to-digital converter (TDC) that includes an analog-to-digital converter (ADC) and a counter circuit coupled together in series as an example. If desired, other types of time-to-digital converter can be implemented. The ADC in time-to-digital converter 56' can receive a reference voltage Vref that is set to mimic an expected voltage level at each dummy pixel 34'. Time-to-digital converter 56' can also receive a reference clock signal CLKref that can include a start pulse for synchronizing with calibration row drivers 41'-1 and 41'-2 to begin conversion at the same time across calibration row 54.

Calibration row drivers 41'-1 and 41'-2 may output one or more row signals to calibration row 54 via row line 36'. Calibration row drivers 41'-1 and 41'-2 may be configured to output a row select signal to row select transistor T4 in each dummy pixel 34' (see FIG. 5), a charge transfer signal to charge transfer gate T1 in each dummy pixel 34', a reset signal to reset transistor T2 in each dummy pixel 34', and/or may be configured to output other row control signals over row line 36'. The same voltage value may be read out from each dummy pixel 34' in calibration row 54. Since the photodiode in each dummy pixel 34' is shorted to VDD or ground, the same low-to-high or high-to-low value can be read out from each dummy pixel 34' as the row control signal propagates down row line 36'. Row control signals output by calibration row driver 41'-1 will propagate down row line 36' from left to right, whereas row control signals output from calibration row driver 41'-2 will propagate down row line 36' from right to left.

In FIG. 8, sampling circuit 56' is disposed at the center location equidistant from row drivers 41'-1 and 41'-2, is coupled to left calibration row driver 41'-1 via a first direct connection path 62-1, and is coupled to right calibration row driver 41'-2 via a second direct connection path 62-2. Since sampling circuit 56' is formed at a middle position between the two calibration row drivers, the propagation delay of line 62-1 will be substantially equal to the propagation delay of line 62-2. Line 62-1 and line 62-2 may have equal lengths. In other words, lines 62-1 and 62-2 can be considered to be balanced routing paths with the same propagation delay.

In a first calibration phase, the left row driver 41'-1 can be activated while the right row driver 41'-2 is disabled. During this first calibration phase, a row control signal output from row driver 41'-1 can propagate through path 62-1 and arrive at TDC 56' to record a first count value. During the first calibration phase, the row control signal can also propagate down row line 36' from left to right and then through path 62-2 from right to left and arrive at TDC 56' to record a second count value. Assuming the propagation of paths 62-1 and 62-2 are equal, a difference between the first and second count values can be computed to determine the amount of propagation delay across delay calibration row 54.

In a second calibration phase, the left row driver 41'-1 can be disabled while the right row driver 41'-2 is activated. During this second calibration phase, a row control signal output from driver 41'-2 can propagate through path 62-2 and arrive at TDC 56' to record a third count value. During the second calibration phase, the row control signal can also propagate down row line 36' from right to left and then through path 62-1 from left to right and arrive at TDC 56' to record a fourth count value. Assuming the propagation of paths 62-1 and 62-2 are matched, a difference between the third and fourth count values can be computed to determine the amount of propagation delay across delay calibration row 54. The propagation delay computed from the first and second calibration phases can optionally be averaged to obtain a final delay value. This example in which calibration row drivers 41'-1 and 41'-2 are activated at different times is illustrative. In other embodiments, the calibration row drivers 41'-1 and 41'-2 can be enabled and/or disabled at the same time or in a staggered fashion. The count value output by the counter of each TDC 56 can optionally be stored for post-processing to determine the amount of propagation delay across the delay calibration row 54.

In certain embodiments, delay calculation and computation circuitry 59 can be configured to receive the stored count values from sampling circuit 56'. The delay calculation and computation circuitry 59 can be configured to compute the difference values obtained based on the count values acquired during the first or second calibration phases. The resulting difference or delay values can be fed to column sample signal generator 60. Column sample signal generator 60 may generate corresponding sampling signals by progressively delaying the sampling signals that are fed to each column readout circuit in circuitry 42 based on the computed difference values. If desired, the delay amounts may also be generated by interpolating the difference values. The sampling signals output by generator 60 may be progressively delayed from left to center and from right to center by a similar amount as detected or observed by delay calibration circuitry 52. Progressively delaying the column sampling signals in this way can help equalize the column sampling error between the different pixel columns in the image sensor. This technique is thus technically advantageous by improving image uniformity across the pixel array, by reducing unwanted gradient artifacts in readout, and can help assist with various types of failure analysis algorithms. Delay calibration circuitry 52 may perform such calibration operations one per frame, once every N frames (where N is equal to two, three, four, five, 2-10, or more than 10), or at an on-demand basis.

The example of FIG. 8 in which delay calibration circuitry 52 includes one calibration row 54 of dummy pixels 34' driven using calibration row drivers 41'-1 and 41'-2 is illustrative. In general, delay calibration circuitry 52 can include one or more calibration rows 54 driven using one or more row drivers 41' on both sides of the array. In another embodiment, delay calibration circuitry 52 can include two calibration rows of dummy pixels 34' driven by two row drivers 41'-1 disposed on the left edge of the array and by two row drivers 41'-2 disposed on the right edge of the array. In another embodiment, delay calibration circuitry 52 can include three calibration rows of dummy pixels 34' driven by three row drivers 41'-1 disposed on the left edge of the array and by three row drivers 41'-2 disposed on the right edge of the array. In another embodiment, delay calibration circuitry 52 can include more than three calibration rows of dummy pixels 34' driven by more than three row drivers 41'-1 disposed on the left edge of the array and by more than three row drivers 41'-2 disposed on the right edge of the array. In such cases stochastic or similar averaging may be applied.

The foregoing is merely illustrative and various modifications can be made to the described embodiments. The foregoing embodiments may be implemented individually or in any combination.

What is claimed is:

1. An image sensor comprising:
    a pixel array; and
    delay calibration circuitry including
        a row of dummy pixels,
        a calibration row driver configured to output a row control signal to the row of dummy pixels via a row line, and
        a plurality of sampling circuits coupled to tap points along the row line and that are used to measure a propagation delay of the row control signal along the row line.

2. The image sensor of claim 1, wherein the plurality of sampling circuits comprises a plurality of time-to-digital converters.

3. The image sensor of claim 2, wherein at least one of the plurality of time-to-digital converters comprises an analog-to-digital converter and a counter.

4. The image sensor of claim 1, wherein at least one of the dummy pixels comprises a photodiode having an anode coupled to a ground power supply line and having a cathode coupled to a positive power supply line or the ground power supply line.

5. The image sensor of claim 1, wherein the plurality of sampling circuits includes only:
    a first sampling circuit coupled to a leading dummy pixel in the row of dummy pixels;
    a second sampling circuit coupled to a middle dummy pixel in the row of dummy pixels; and
    a third sampling circuit coupled to a last dummy pixel in the row of dummy pixels.

6. The image sensor of claim 1, wherein the plurality of sampling circuits comprises a plurality of sampling circuits coupled to a subset of dummy pixels in the row of dummy pixels.

7. The image sensor of claim 1, wherein the delay calibration circuitry further comprises:
    interpolation circuitry configured to receive count values from the plurality of sampling circuits.

8. The image sensor of claim 7, wherein the delay calibration circuitry further comprises:
    a column sampling signal delay generator configured to receive interpolated values from the interpolation circuitry and to generate sampling signals that are progressively delayed with respect to one another based on the interpolated values.

9. The image sensor of claim 8, further comprising:
    column readout circuitry configured to receive signals from the pixel array and controlled by the sampling signals generated by the column sampling signal delay generator.

10. The image sensor of claim 1, wherein the delay calibration circuitry further comprises:
    an additional calibration row driver configured to output an additional row control signal to the row of dummy pixels via the row line.

11. The image sensor of claim 10, wherein the calibration row driver is disposed at a first end of the row of dummy pixels and wherein the additional calibration row driver is disposed at a second end opposing the first end of the row of dummy pixels.

12. The image sensor of claim 1, wherein the delay calibration circuitry further comprises:
    an additional row of dummy pixels; and
    an additional calibration row driver configured to output an additional row control signal to the additional row of dummy pixels via an additional row line.

13. Imaging circuitry comprising:
    a pixel array; and
    delay calibration circuitry including
        a row of dummy pixels,
        a calibration row driver configured to output a row control signal to the row of dummy pixels via a row line, and
        at least one sampling circuit coupled to one or more dummy pixels in the row of dummy pixels and that is used to measure a propagation delay of the row control signal along the row line.

14. Imaging circuitry of claim 13, wherein the delay calibration circuitry further comprises:
    an additional row of dummy pixels; and
    an additional calibration row driver configured to output an additional row control signal to the additional row of dummy pixels via an additional row line.

15. The imaging circuitry of claim 13, wherein at least one of the dummy pixels comprises a photodiode having an anode coupled to a first power supply line and having a cathode coupled to a second power supply line different than the first power supply line.

16. The imaging circuitry of claim 13, wherein the at least one sampling circuit comprises a time-to-digital converter that includes an analog-to-digital converter and a counter.

17. The imaging circuitry of claim 13, wherein the at least one sampling circuit is coupled to a leading dummy pixel in the row of dummy pixels via a first path and is coupled to a last dummy pixel in the row of dummy pixels via a second path, and wherein the first and second paths have equal lengths.

18. The imaging circuitry of claim 17, wherein the delay calibration circuitry further comprises:
    delay calculation and computation circuitry configured to receive count values from the at least one sampling circuit and configured to compute a difference value based on the received count values; and
    a column sampling signal delay generator configured to generate sampling signals that are progressively delayed with respect to one another based on the computed difference value.

19. The imaging circuitry of claim 18, further comprising:
column readout circuitry configured to receive signals from the pixel array and controlled by the sampling signals generated by the column sampling signal delay generator.

20. A method of operating an image sensor, comprising:
generating a calibration row control signal;
propagating the calibration row control signal down a row of dummy pixels;
with one or more sampling circuits coupled to one or more tap points in the row of dummy pixels, monitoring when the calibration row control signal arrives at the one or more tap points as the calibration row control signal propagates down the row of dummy pixels;
outputting signals from a pixel array separate from the row of dummy pixels; and
controlling column readout circuitry that receives the signals from the pixel array using sampling signals that are progressively delayed based on count values output from the one or more sampling circuits.

* * * * *